United States Patent [19]

McDaniel et al.

[11] Patent Number: 6,165,929
[45] Date of Patent: Dec. 26, 2000

[54] COMPOSITIONS THAT CAN PRODUCE POLYMERS

[75] Inventors: Max P. McDaniel; Shirley J. Martin; Kathy S. Collins; Marvin M. Johnson, all of Bartlesville, Okla.

[73] Assignee: Phillips Petroleum Company, Bartlesville, Okla.

[21] Appl. No.: 09/081,480

[22] Filed: May 18, 1998

[51] Int. Cl.$^7$ .................................. B01J 31/00; C08F 4/02
[52] U.S. Cl. .......................... 502/117; 502/102; 502/103; 502/104; 502/113; 502/118; 502/119; 502/121; 502/122; 502/123; 502/129; 502/131; 502/132; 502/134
[58] Field of Search ..................... 502/102, 103, 502/104, 113, 117, 118, 119, 129, 131, 132, 134, 122, 123, 121

[56] References Cited

U.S. PATENT DOCUMENTS

| | | | |
|---|---|---|---|
| 4,077,904 | 3/1978 | Noshay et al. | |
| 4,101,445 | 7/1978 | Levine et al. | |
| 4,279,780 | 7/1981 | Dombro | |
| 4,476,243 | 10/1984 | Dombro | 502/236 |
| 4,526,942 | 7/1985 | Chester et al. | 526/130 |
| 4,657,998 | 4/1987 | Malpass | 526/144 |
| 4,659,685 | 4/1987 | Coleman, III et al. | 502/113 |
| 4,788,171 | 11/1988 | Klendworth | 502/115 |
| 4,803,253 | 2/1989 | McDaniel et al. | 526/352.2 |
| 4,969,522 | 11/1990 | Whitehurst et al. | 166/278 |
| 5,001,204 | 3/1991 | Klendworth et al. | 526/106 |
| 5,183,868 | 2/1993 | Nordquest | 526/155 |
| 5,321,105 | 6/1994 | Rekers et al. | 526/104 |
| 5,332,707 | 7/1994 | Karayannis et al. | 502/113 |
| 5,401,820 | 3/1995 | McDaniel et al. | 526/348.5 |
| 5,439,995 | 8/1995 | Bailly et al. | 526/125 |
| 5,444,134 | 8/1995 | Matsumoto | 526/159 |
| 5,461,127 | 10/1995 | Naganuma et al. | 526/127 |
| 5,468,702 | 11/1995 | Jejelow | 502/104 |
| 5,496,782 | 3/1996 | Zandona | 502/113 |
| 5,527,867 | 6/1996 | Bergmeister | 526/119 |
| 5,556,893 | 9/1996 | Costa et al. | 521/143 |
| 5,612,271 | 3/1997 | Zandona | 502/117 |
| 5,643,847 | 7/1997 | Walzer | 502/117 |
| 5,648,439 | 7/1997 | Bergmeister et al. | 526/96 |
| 5,670,580 | 9/1997 | Tazaki et al. | 525/240 |
| 5,861,352 | 1/1999 | Gila et al. | 502/155 |

OTHER PUBLICATIONS

"A Crystallizable Organometallic Complex containing titanium and aluminum" Jounal of the American Chemical Society, vol. 79, No. 11, pp. 2975–2976 (1957). No month.

"BIS–(Cyclopentadienyl)–Titanium Dichloride–Alkylaluminum Complexes as Catalysts for the Polymerization of Ethylene" Journal of the American Chemical Society, vol. 79, No. 18, pp. 5072–5073 (1957). No month.

"Olefin Copolymerization with Metallocene Catalysts, III Supported Metallocene/Methylauminoxane Catalyst for Olefin Copolymerization" Journal of Polymer Science, Part A, Polymer Chemistry, vol. 29, p. 1603 (1991). No month.

"Polymerization of Propene with Catalyst Systems Composed of $Al_2O_3$–OR $MGCL_2$–Supported $ET[INDH_4]_2ZRCL_2$ And $ALR_3(R=CH_3, C_2H_5)$" Makromol. Chem., Rapid Commun. 12, 367–372 (1991). No month.

Surface–Bound Metal Hydrocarbyls. Organometallic Connections Between Accounts of Chemical Research, vol. 25, No. 2, p. 57 (1992). No month.

Polymerization of Propylene Using Supported, Chiral, Ansa–Metallocene Macromolecules, vol. 25, pp. 1780–1785 (1992). No month.

Polymerization of Propene with the Heterogeneous Catalyst System Makromol. Chem., Rapid Commun. 13, 221–224 (1992). No month.

"High Melting Polypropenes by Silica–Supported Zirconocene Catalysts" Makromol. Chem., Rapid Commun. 14, 239–243 (1993). No month.

Polymerization of Propene With Zirconocene–Containing Supported Catalysts Makromol. Chem. 194, 1745–1755 (1993). No month.

"Highly Isospecific $SIO_2$–Supported Zirconocene Catalyst Activated by Ordinary "Makromol. Chem., Rapid Commun. 15, 139–143 (1994). No month.

Silica–Supported Metallocenes: Stereochemical Comparison Between Homogeneous Makromol. Chem., Rapid Commun. 16, 581–590 (1995). No month.

"Metallocenes for Polymer Catalysis" Advances in Polymer Science, vol. 127, p. 143 (1997). No month.

*Primary Examiner*—Elizabeth D. Wood
*Attorney, Agent, or Firm*—Polly C. Owen; Carl D. Corvin

[57] ABSTRACT

A process is provided to produce a composition of matter. The process comprises contacting at least one organometal compound, at least one solid mixed oxide compound, and at least one organoaluminum compound to produce the composition.

24 Claims, No Drawings

COMPOSITIONS THAT CAN PRODUCE POLYMERS

FIELD OF THE INVENTION

This invention is related to the field of compositions that can be used to polymerize monomers into at least one polymer.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1960, however, their low productivity did not allow them to be commercialized. About 1975, it was discovered that contacting one part water with two parts trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Borate compounds have been use in place of large amounts of methyl aluminoxane. However, this is not satisfactory, since borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniformed particles are desirable because they improve the efficiency of polymer production and transportation. Efforts have been made to produce heterogeneous metallocene catalysts, however, these catalysts have not been entirely satisfactory.

Therefore, the inventors provide this invention to solve these problems.

SUMMARY OF THE INVENTION

An object of this invention is to provide a process that produces a composition that can be used to polymerize monomers into at least one polymer.

Another object of this invention is to provide said composition.

Another object of this invention is to provide a process to polymerize monomers into at least one polymer using said composition.

Another object of this invention is to provide a manufacture that comprises at least one said polymer.

Another object of this invention is to provide a machine that comprises at least one said manufacture.

In accordance with one embodiment of this invention, a process to produce a composition of matter is provided. Said process comprises (or optionally, consists essentially of, or consists of) contacting an organometal compound, a solid Lewis acid compound, and an organoaluminum compound to produce said composition, wherein said composition consists essentially of (or optionally, consists of) a post-contacted organometal compound, a post-contacted solid Lewis acid compound, and optionally, a post-contacted organoaluminum compound.

In accordance with another embodiment of this invention, a composition of matter is provided. Said composition consists essentially of a post-contacted organometal compound, a post-contacted solid Lewis acid compound, and optionally, a post-contacted organoaluminum compound.

In accordance with another embodiment of this invention, a process to polymerize monomers into at least one polymer using said composition is provided. Said process comprises contacting said composition with monomers.

In accordance with another embodiment of this invention a manufacture is provided. Said manufacture comprises at least one said polymer.

In accordance with another embodiment of this invention a machine is provided. Said machine comprises at least two said manufactures.

These objects, and other objects, will become more apparent to those with ordinary skill in the art, by reading this disclosure.

It should be noted that the phrase "consisting essentially of" means that the only other items (such as, for example, process steps, and other compounds) included within the scope of the claims are those items that do not materially affect the basic and novel characteristics of the claimed invention.

It should also be noted that the phrase "consisting of" means that the no other items (such as, for example, process steps, and other compounds) are included within the scope of the claims, except items that are impurities ordinarily associated with a composition, or items that are process steps ordinarily associated with a process.

DETAILED DESCRIPTION OF THE INVENTION

Organometal compounds used in this invention have the following general formula.

$$(X^1)(X^2)(X^3)(X^4)M^1 \qquad \text{FORMULA ONE}$$

In this formula, $M^1$ is selected from the group consisting of titanium, zirconium, and hafnium. Currently, it is most preferred when $M^1$ is zirconium.

In this formula $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

The substituents on the substituted cyclopentadienyls, substituted indenyls, and substituted fluorenyls, can be aliphatic groups, cyclic groups, combinations of aliphatic and cyclic groups, and organometallic groups, as long as these groups do not substantially, and adversely, affect the polymerization activity of the composition. Additionally, hydrogen can be a substituent.

Suitable examples of aliphatic groups are hydrocarbyls, such as, for example, paraffins and olefins. Suitable examples of cyclic groups are cycloparaffins, cycloolefins, cycloacetylenes, and arenes. Additionally, alkylsilyl groups where each alkyl contains 1–12 carbon atoms, alkyl halide groups where each alkyl contains 1–12 carbon atoms, or halides, can also be used.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, and iodo.

In this formula $(X^3)$ and $(X^4)$ are independently selected from the group consisting of (hereafter "Group OMC-II") halides, aliphatic groups, cyclic groups, combinations of aliphatic and cyclic groups, and organometallic groups, as long as these groups do not substantially, and adversely, affect the polymerization activity of the composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to 10 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

When $(X^2)$ is selected from Group OMC-I, it should be noted that $(X^1)$ and $(X^2)$ can be joined with a bridging group, such as, for example, aliphatic bridging groups, cyclic bridging groups, combinations of aliphatic and cyclic bridging groups, and organometallic bridging groups, as long as the bridging group does not substantially, and adversely, affect the polymerization activity of the composition.

Suitable examples of aliphatic bridging groups are hydrocarbyls, such as, for example, paraffins and olefins. Suitable examples of cyclic bridging groups are cycloparaffins, cycloolefins, cycloacetylenes, and arenes. Additionally, it should be noted that silicon and germanium are also good bridging units.

Various processes are known to make these compositions. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such compositions are as follows:
bis(cyclopentadienyl)hafnium dichloride;
bis(cyclopentadienyl)zirconium dichloride;
[ethyl(indenyl)₂]hafnium dichloride;
[ethyl(indenyl)₂]zirconium dichloride;
[ethyl(tetrahydroindenyl)₂]hafnium dichloride;
[ethyl(tetrahydroindenyl)₂]zirconium dichloride;
bis(n-butylcyclopentadienyl)hafnium dichloride;
bis(n-butylcyclopentadienyl)zirconium dichloride;
((dimethyl)(diindenyl)silane)zirconium dichloride;
((dimethyl)(diindenyl)silane)hafnium dichloride:
((dimethyl)(ditetrahydroindenyl)silane)zirconium dichloride;
((dimethyl)(di(2-methyl indenyl))silane)zirconium dichloride; and
bis(fluorenyl)zirconium dichloride.

Organoaluminum compounds have the following general formula.

$$Al(X^5)_n(X^6)_{3-n} \qquad \text{FORMULA TWO}$$

In this formula $(X^5)$ is a hydrocarbyl having from 1–20 carbon atoms. Currently, it is preferred when $(X^5)$ is an alkyl having from 1 to 10 carbon atoms. However, it is most preferred when $(X^5)$ is selected from the group consisting of methyl, ethyl, propyl, butyl, and isobutyl.

In this formula $(X^6)$ is a halide, hydride, or alkoxide. Currently, it is preferred when $(X^6)$ is independently selected from the group consisting of fluoro and chloro. However, it is most preferred when $(X^6)$ is chloro.

In this formula "n" is a number from 1 to 3 inclusive. However, it is preferred when "n" is 3.

Examples of such compounds are as follows:
trimethylaluminum;
triethylaluminum;
tripropylaluminum;
diethylaluminum ethoxide;
tributylaluminum;
triisobutylaluminum hydride;
triisobutylaluminum; and
diethylaluminum chloride.

Currently, triethylaluminum is preferred.

Solid Lewis acid compounds are compounds that have Lewis acidity. It is preferred when said solid Lewis acid compounds comprise solid mixed oxides. It is also preferred when said solid mixed oxide compounds comprise oxygen and at least two elements selected from the group consisting of groups 2, 3, 4, 5, 6, 7, 8, 9, 10, 11, 12, 13, 14, and 15 of the periodic table, including lanthanides and actinides (See Hawley's Condense Chemical Dictionary, 11th Edition). However, it is preferred when the elements are selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr. It is important that these solid mixed oxide compounds have electron withdrawing ability, while not wanting to be bound by theory, it is believed that solid mixed oxide compounds should have high Lewis acidity. However, it is hard to accurately measure the Lewis acidity of these solid mixed oxide compounds, or other solid Lewis acid compounds, so other methods have been used. Currently, comparing the activities of solid mixed oxide compounds, or solid Lewis acid compounds, under acid catalyzed reactions is preferred.

Suitable examples of solid mixed oxide compounds include, but are not limited to, mixtures of $Al_2O_3$, $B_2O_3$, BeO, $Bi_2O_3$, CdO, $Co_3O_4$, $Cr_2O_3$CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, and $ZrO_2$. Currently, a solid mixed oxide compound containing three or more elements is preferred. One preferred solid mixed oxide compound comprises a mixed oxide that has oxygen bonded to Zr, B, and Al. Additionally, it should be noted that solid mixed oxide compounds that comprise Al—O and two other element-oxygen bonds are currently preferred.

It is important that the solid mixed oxide compound is calcined. This calcining can be conducted in an ambient atmosphere, preferably a dry ambient atmosphere, at a temperature in the range of about 300° C. to about 900° C., and for a time in the range of about 1 minute to about 100 hours. Currently, temperatures from about 500° C. to about 700° C. and a time in the range of about 1 hour to about 10 hours, are preferred.

Solid mixed oxide compounds, should have pore volumes greater than about 0.01 cc/g, preferably greater than about 0.1 cc/g, and most preferably, greater than about 1 cc/g.

Solid Lewis acid compounds should have surface areas greater that about 1 m²/g, preferably greater than 100 m²/g, and most preferably greater than 200 m²/g.

Solid mixed oxide compounds should have surface areas greater that about 1 m²/g, preferably greater than 100 m²/g, and most preferably greater than 200 m²/g.

Solid mixed oxide compounds can be produced in a variety of ways, such as, for example, co-gelling, or impregnation of one compound onto another.

The compositions of this invention can be produced by contacting an organometal compound, a solid Lewis acid compound, preferably a solid mixed oxide compound, and an organoaluminum compound, together. This contacting can occur in a variety of ways, such as, for example, blending. Furthermore, each of these compounds can be fed into the reactor separately, or various combinations of these compounds can be contacted together before being further contacted in the reactor, or all three compounds can be contacted together before being introduced into the reactor. Currently, one method is to first contact the organometal compound and the solid Lewis acid compound together, for about 1 minute to about 24 hours, preferably, about 1 minute to about 1 hour, at a temperature from about 10° C. to about 200° C., preferably about 25° C. to about 100° C., to form a first mixture, and then contact this first mixture with an organoaluminum compound to form the composition.

During contacting, or after contacting, the mixtures or the composition can be calcined. This calcining can be conducted in an ambient atmosphere, preferably a dry ambient atmosphere, at a temperature in the range of about 300° C. to about 900° C., and for a time in the range of about 1 minute to about 100 hours. Currently, temperatures from about 500° C. to about 700° C. and a time in the range of about 1 hour to about 10 hours, are preferred.

After contacting, the composition consists essentially of, (or consists of) a post-contacted organometal compound, a post-contacted solid Lewis acid compound, and optionally, a post-contacted organoaluminum compound. It should be noted that the post-contacted solid Lewis acid compound is the majority, by weight, of the composition. Since the exact order of contacting is not known, it is believed that this terminology best describes the composition's components.

The composition of this invention has an activity greater than a compound that uses the same organometal compound, and the same organoaluminum compound, but uses untreated Ketjen grade B alumina (see comparative examples 4, 5, and 6) instead of the solid Lewis acid compounds of this invention. This activity is measured under slurry polymerization conditions, using isobutane as the diluent, and with a polymerization temperature in the range of 50 to 150° C., and an ethylene pressure of in the range of 400 to 800 psig. However, it is preferred if the activity is greater than 100 grams polyethylene per gram of solid Lewis acid compound per hour (hereafter "gP/(gS·hr)"), more preferably greater than 150, even more preferably greater than 200, even more preferably greater than 250, and most preferably greater than 300. This activity is measured under slurry polymerization conditions, using isobutane as the diluent, and with a polymerization temperature in the range of 90° C., and an ethylene pressure of in the range of 550 psig. The reactor should have substantially no indication of any wall scale, coating or other forms of fouling.

These compositions are often sensitive to hydrogen and sometimes incorporate comonomers well, and usually produce polymers with a low HLMI/MI ratio.

One of the important aspects of this invention is that no aluminoxane needs to be used in order to form the composition. This also means that no water is needed to help form such aluminoxanes. This is beneficial because water can sometimes kill a polymerization process. Additionally, it should be noted that no borate compounds need to be used in order to form the composition. In summary, this means that the composition, which is heterogenous, and which can be used for polymerizing monomers, can be easily and inexpensively produced because of the substantial absence of any aluminoxane compounds or borate compounds. Additionally, no organochromium needs to be added, nor any $MgCl_2$ needs to be added to form the invention.

The monomers useful in this invention, are unsaturated hydrocarbons having from 2 to 20 carbon atoms. Currently, it is preferred when the monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof. However, when a homopolymer is desired, it is most preferred to use ethylene, or propylene, as the monomer. Additionally, when a copolymer is desired, it is most preferred to use ethylene and hexene as the monomers.

Processes that can polymerize monomers into polymers are known in the art, such as, for example, slurry polymerization, gas phase polymerization, and solution polymerization. It is preferred to perform a slurry polymerization in a loop reactor. Furthermore, it is even more preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

It should be noted that under slurry polymerization conditions these compositions polymerize ethylene alone, or ethylene with a 1-olefin, or propylene very well. In particular, the compositions used in this process produce good quality polymer particles without substantially fouling the reactor. When the composition is to be used in a loop reactor under slurry polymerization conditions, it is preferred when the particle size of the solid mixed oxide compound is in the range of about 10 to about 1000 microns, preferably 25 to 500 microns, and most preferably, about 50 to about 200 microns, for best control during polymerization.

After the polymers are produced, they can be formed into various manufactures, such as, for example, household containers and utensils, drums, fuel tanks, pipes, geomembranes, and liners. Various processes can form these manufactures. Usually, additives and modifiers are added to the polymer in order to provide desired effects. It is believed that by using the invention described herein, manufactures can be produced at a lower cost, while maintaining most, if not all, of the unique properties of polymers produced with metallocene catalysts.

Additionally, these manufactures can be part of a machine, such as, for example, a car, so that the weight of the car will be less, with the attended benefits thereof.

EXAMPLES

These examples provide additional information to a person skilled in the art. These examples are not meant to be construed as limiting the scope of the claims.

Description of the Polymerizations Runs

All polymerization runs were conducted in a steel reactor that had a volume of 2.2 liters. This reactor was equipped with a marine stirrer. During the polymerizations this stirrer was set to run at 400 rpm. This reactor was also surrounded by a steel jacket that was connected to a steel condenser. The steel jacket contained methanol that was boiling. The boiling point of the methanol was controlled by varying the nitrogen pressure that was applied to the steel condenser and the steel jacket. This control method permitted precise temperature control (±0.5° C.).

First, a solid oxide compound (either a solid unmixed oxide or a solid mixed oxide) was charged, under nitrogen, to the reactor, which was dry. Second, organometal compound solution was added to the reactor by syringe. Third, 0.6 liters of isobutane was charged to the reactor. Fourth, organoaluminum compound was added to the reactor. Fifth, 0.6 liters of isobutane was charged to the reactor. Sixth, ethylene was added to the reactor to equal 550 psig pressure. Seventh, the reactor was heated to 90° C. This pressure was maintained during the polymerization. During polymerization, stirring continued for the specified time. Activity was determined by recording the flow of ethylene into the reactor to maintain pressure. Seventh, after the specified time, the ethylene flow was stopped and the reactor slowly depressurized. Eighth, the reactor was opened to recover a granular polymer powder.

In all inventive runs, the reactor was clean with no indication of any wall scale, coating or other forms of fouling. The polymer powder was removed and weighed. Activity was specified as grams of polymer produced per gram of solid oxide compound charged per hour.

In some cases the solid oxide compound and the organometal compound were first pre-contacted, in the reactor, for about half an hour at 90° C. in one liter of isobutane before the organoaluminum compound and ethylene were added to the reactor.

Preparation of Solid Oxides

Silica, grade 952, having a pore volume of 1.6 cc/g and a surface area of about 300 square meters per gram was obtained from W.R.Grace. About 10 grams of this material was placed in a 1.75 inch quartz tube, which was fitted at the bottom with a sintered quartz. While the silica was supported on the disk, dry air was blown up through the disk at the linear rate of about 1.6 to 1.8 standard cubic feet per hour. An electric furnace around the quartz tube was then turned on and the temperature was raised at the rate of 400° C. per hour to a temperature of 600° C. At that temperature, the silica was allowed to fluidize for three hours in the dry air. Afterward, the silica was collected and stored under dry nitrogen.

Some alumina samples were also prepared by the procedure described in the silica preparation. A commercial alumina sold as Ketjen grade B alumina was obtained, having a pore volume of about 1.78 cc/g and a surface area of around 340 square meters per gram. The temperatures use in the preparation of these aluminas were 400° C., 600° C., and 800° C.

A silica-alumina was also obtained from W.R.Grace (MS 13-110 containing 13% alumina and 87% silica). This silica-alumina had a pore volume of 1.2 cc/g and a surface area of about 300 square meters per gram. This silica-alumina was prepared as described in the silica preparation. The temperature use in the preparation of this silica-alumina was 600 C.

A silica-titania was obtained by co-gellation as described in U.S. Pat. No. 3,887,494 ("Deitz"). Titanyl sulfate was dissolved in concentrated sulfuric acid, to form a first mixture. Afterwards, a sodium silicate solution was slowly added, with vigorous stirring, to this first mixture, to form a second mixture. When the pH of the second mixture reached about 6, this second mixture gelled into a homogenous, substantially-clear first product. This first product was then aged, at 80° C. and a pH 7, for three hours, followed by washing it nine times with water, and two times in 1% ammonium nitrate, to form a second product. This second product, which was a gel, was then azeotropically dried in ethyl acetate, to form a third product. This third product contained 8% titanium. It also had a surface area of 450 square meters per gram and a pore volume of 2.0 cc/g. This silica-titania was then prepared as described in the silica preparation. The temperature use in the preparation of this silica-titania was 600° C.

An alumino-phosphate was prepared according to U.S. Pat. No. 4,364,855 (McDaniel). Aluminum nitrate (380 grams) and mono-ammonium phosphate (94 grams) was dissolved in deionized water to form a first mixture. About 170 milliliters of ammonium hydroxide was then added to this first mixture to form a second mixture. At a pH of about 8 this second mixture gelled to form a first product. This first product was then washed twice in water, and once in n-propanol, before drying overnight at 80° C. under a vacuum, to form a second product. This second product contained a phosphorus to aluminum molar ratio of 0.8, a pore volume of 2.1 cc/g, and a surface area of 250 square meters per gram. This alumino-phosphate was then prepared as described in the silica preparation. The temperature use in the preparation of this alumina-phosphate was 600° C.

Another aluminophosphate support was made according to the preparation above but the phosphorous to aluminum molar ratio was adjusted to equal 0.4. This mixed oxide had a pore volume after calcining of 2.5 cc/g and a surface area of 450 m$^2$/g. The mixed oxide was activated by calcination at 750° C.

Comparative Examples 1–2

These examples demonstrate that an organometal compound contacted with an organoaluminum compound, provides little, if any, polymerization activity.

A polymerization run was made as described earlier. First, an organometal compound was added to the reactor (2 ml of bis(n-butylcyclopentadienyl) zirconium dichloride solution (0.5 grams per 100 ml of toluene)). Second, half of the isobutane was then added to the reactor. Third, 2 ml of 15 weight percent triethyl aluminum for example 1, or 2 ml of 25 weight percent ethyl aluminum dichloride (EADC) for example 2, were added to the reactor. Fourth, the other half of the isobutane was added to the reactor.

Ethylene was then added to the reactor but no polymerization activity was observed. After one hour of contacting, the reactor was depressurized and opened.

In each case, no polymer was found. These results are shown in Table-I.

Comparative Examples 3–6, 9 and Examples 7–8

These examples demonstrate that contacting a solid oxide compound, with an organometal compound, and with an organoaluminum compound, provided little, if any, polymerization activity.

Each of the solid oxide compounds described earlier was added to the reactor, followed by an organometal compound (2 ml of bis(n-butylcyclopentadienyl)zirconium dichloride solution (0.5 grams per 100 ml of toluene), and then the organoaluminum compound (triethylaluminum). These examples are shown in Table-I.

The first two examples show that contacting an organometal compound with an organoaluminum compound provides little, if any, polymerization activity. The silica example produced almost no polymer. Alumina, which is regarded as more acidic than silica, produced more polymer, but still the activity was very low. The alumino-phosphate, silica-alumina, and silica-titania supports exhibited only marginal activity. Activity is expressed in Table-I as gP/ (gS·hr).

Comparative Example 10 & Examples 11–12

These examples show how to produce a composition that can be used to polymerize monomers into polymers. Additionally, these examples show the importance of the organoaluminum compound.

A solid mixed oxide compound was prepared by co-gelling approximately equal mole parts of boria, alumina, and zirconia. Aluminum nitrate nonahydrate (287 grams), boric acid (35 grams), and zirconyl nitrate dihydrate (25 grams), were dissolved in deionized water (500 milliliters) to form a first mixture. This first mixture was then gelled by contacting this first mixture with concentrated (28 weight percent $NH_3$ in water) ammonium hydroxide (210 milliliters), using a stirrer, to form a second mixture. This second mixture, which was a gel, was washed once in four liters of water, followed by filtration, and than another wash in four liters of n-propanol. After being dried overnight in a vacuum oven at 100° C., the dry gel was pushed through a 35 mesh screen. A ten gram sample was prepared as described in the silica preparation to produce a solid mixed oxide compound. The temperature use in the preparation of this sample was 600° C.

In Example 10 the activity for ethylene polymerization was zero. In Example 11 the reactor filled with polymer, giving a high activity. This polymer was found to have a melt index of 0 and a high load melt index of 1.2. In Example 12 high activity was also obtained. See Table-I.

Comparative Example 13

Another three component solid mixed oxide compound was prepared by co-gellation of about 47.5 mole percent boria, 47.5 mole percent alumina, and 5 mole percent zirconia. Aluminum nitrate nonahydrate (187 grams), boric acid (31 grams), and zirconyl nitrate dihydrate (14 grams), were dissolved in deionized water (500 milliliters) to form a first mixture. This first mixture was then gelled by contacting this first mixture with concentrated ammonium hydroxide (130 milliliters), using a stirrer, to form a second mixture. This second mixture, which was a gel, was washed once in four liters of water, followed by filtration, and then wash in four liters of n-propanol. After being dried overnight in a vacuum oven at 100° C., the dry gel was pushed through a 35 mesh screen. A ten gram sample was prepared as described in the silica preparation to produce a solid mixed oxide compound. The temperature use in the preparation of this sample was 600° C. After calcination, the surface area was found to be 491 $m^2/g$ and the pore volume was found to be 0.86 cc/g.

In this example the compositions activity for ethylene polymerization was satisfactory. The polymer was found to have a melt index of 0.1 and a high load melt index of 3.19 giving a shear response (HLMI/MI) of 31.

Comparative Example 14

An aqueous cogel was made by a procedure similar to that above containing about 67 mole percent alumina and 33 mole percent zirconia. Aluminum nitrate nonahydrate (187 grams) and zirconyl nitrate dihydrate (67 grams), were dissolved in deionized water (500 milliliters) to form a first mixture. This first mixture was then gelled by contacting this first mixture with concentrated ammonium hydroxide (140 milliliters), using a stirrer, to form a second mixture. This second mixture, which was a gel, was washed once in four liters of water, followed by filtration, and then wash in four liters of n-propanol. After being dried overnight in a vacuum oven at 100° C., the dry gel was pushed through a 35 mesh screen. A ten gram sample was prepared as described in the silica preparation to produce a solid acid compound. The temperature use in the preparation of this sample was 600° C. After calcination, the surface area was found to be 319 $m^2/g$ and the pore volume was found to be 0.55 cc/g.

Comparative Example 15

A cogel was made anhydrously to contain about 50 mole percent alumina and 50 mole percent boria. Aluminum isopropoxide (150 grams of 33 weight percent in butanol) and boric acid (15 grams) were dissolved in n-propanol (750 milliliters) to form a first mixture. This first mixture slowly thickened. A solution of 7.5 milliliters of water combined with 7.5 milliliters of concentrated ammonium hydroxide was added to this first mixture to cause gellation. The gel was then dried in a vacuum oven at 100° C. overnight and then was ground through a 35 mesh sieve. A sample was calcined in air at 600° C. to yield a pore volume of 0.84 cc/g and a surface area of 378 square meters per gram. When tested for polymerization activity it yielded an activity of 25 g/g/h.

Comparative Example 16 & Example 17

Ketjen grade B alumina (13.8 grams) was impregnated with a solution of 14 milliliters of zirconium butoxide-butanol complex in 26 ml of isopropanol. This made a damp powder which was then dried in a vacuum oven overnight at 100° C., and then calcined in air at 700° C. A polymerization test delivered nine grams of polymer for an activity of 26 g/g/h.

The procedure of example 16 was followed except that the zirconia was gelled in place before calcination. Ketjen B alumina (27.4 grams) was impregnated with a solution of 27 milliliters of zirconium butoxide-butanol complex in 23 milliliters of isopropanol to make a damp powder. Then, 2 milliliters of concentrated ammonium hydroxide combined with 5 milliliters of water was also added to the dry powder after the zirconium butoxide had been added so that a zirconia gel would form within the pores of the alumina. This material was vacuum dried overnight at 100° C., pushed through a 35 mesh sieve, and calcined in air at 700° C.

Example 18

Alumina was impregnated with boria in this example. Boric acid (7.33 grams) was dissolved in 43 milliliters of methanol. This solution was then added to 21.8 grams of Ketjen grade B alumina. The mixture was shaken until a uniform state of wetness was achieved. Then the material was dried in a vacuum oven overnight at 90° C. and pushed through a 35 mesh screen. After being calcined in air at 600° C. the compound was found to have a pore volume of 1.02 cc/g and a surface area of 319 square meters per gram.

Example 19

Alumnio-phosphate with a P/Al of 0.4 was also tested after calcination at 750° C.

TABLE I

| Ex. # | A¹ | °C.² | S³ | OAC⁴ | | P⁵ | T⁶ | A⁷ |
|---|---|---|---|---|---|---|---|---|
| 1⁸ | None | NA | 0.0000 | 2 | TEA | 0 | 61.1 | 0 |
| 2 | None | NA | 0.0000 | 2 | EADC | 0 | 28.0 | 0 |
| 3 | Silica | 600 | 0.5686 | 2 | TEA | 0.65 | 63.0 | 1 |
| 4 | Alumina | 800 | 0.6948 | 1 | TEA | 2.7 | 30.7 | 8 |
| 5 | Alumina | 600 | 0.2361 | 2 | TEA | 6.9 | 60.9 | 29 |
| 6 | Alumina | 400 | 0.8475 | 1 | TEA | trace | 57.2 | 0 |
| 7 | Alumino-Phosphate | 600 | 0.8242 | 1 | TEA | 45 | 66.0 | 50 |
| 8 | Silica-Alumina | 600 | 0.3912 | 1 | TEA | 8.3 | 40.0 | 32 |
| 9 | Silica-Titania | 600 | 0.1392 | 2 | TEA | 0 | 60.0 | 0 |
| 10 | Zr—Al—B | 600 | 0.9462 | | none | 0.4 | 46.4 | 0 |
| 11 | Zr—Al—B | 600 | 1.0805 | 2 | TEA | 310.0 | 60.5 | 285 |
| 12 | Zr—Al—B | 600 | 0.3080 | 2 | TEA | 76.4 | 60.0 | 248 |
| 13 | Zr—Al—B | 600 | .8742 | 2 | TEA | 262.7 | 60.0 | 301 |
| 14 | Zr—Al | 600 | 1.5694 | 2 | TEA | 12.1 | 25.0 | 19 |
| 15 | B—Al | 600 | 1.1408 | 2 | TEA | 10.6 | 22.0 | 25 |
| 16 | Zr—Al | 700 | 0.9066 | 2 | TEA | 9.0 | 25.5 | 26 |
| 17 | Zr—Al | 700 | 0.1732 | 2 | TEA | 9.0 | 21.2 | 147 |
| 18 | B—Al | 600 | 0.8527 | 2 | TEA | 11.8 | 22.5 | 37 |
| 19 | Alumino-Phosphate | 750 | 0.1267 | 2 | TEA | 33.1 | 60.2 | 260 |

Table I Notes

[1] This is the solid unmixed oxide compound used, or the solid mixed oxide compound used.
[2] This is the calcining temperature.
[3] This is the amount of solid oxide compound, in grams, being contacted with the other compounds.
[4] This is the amount, in milliliters of organoaluminum compound used and the type of organoaluminum used. The TEA was a 15 weight percent solution of triethylaluminum in heptane.
[5] This is the amount of polymer produced in grams.
[6] This is the amount of time used in minutes.
[7] This is the activity in gP/(gS · hr).
[8] The amount of organometal compound used was 25 micromoles. The type of organometal compound used was bis(n-butylcyclopentadienyl) zirconium dichloride. This organometal compound was in a solution that contained 0.5 grams of bis(n-butylcyclopentadienyl) zirconium dichloride per 100 milliliters of toluene. Additionally, these example were run at 90° C., under 550 psig ethylene, in 1.2 liters of isobutane.

That which is claimed is:

1. A process to produce a composition of matter, said process comprising contacting at least one organometal compound, at least one solid mixed oxide compound, and at least one organoaluminum compound to produce said composition, wherein said organometal compound has the following general formula $$(X^1)(X^2)(X^3)(X^4)M^1$$

wherein $M^1$ is selected from the group consisting of titanium, zirconium, and hafnium, and wherein $(X^1)$ is independently selected from the group consisting of cyclopentadienyls, indenyls, fluorenyls, substituted cyclopentadienyls, substituted indenyls, and substituted fluorenyls, and wherein said substituents on said substituted cyclopentadienyls, substituted indenyls, and substituted fluorenyls, are selected from the group consisting of aliphatic groups, cyclic groups, combinations of aliphatic and cyclic groups, and organometallic groups, and hydrogen; and wherein $(X^3)$ and $(X^4)$ are independently selected from the group consisting of halides, aliphatic groups, cyclic groups, combinations of aliphatic and cyclic groups, and organometallic groups, and wherein $(X^2)$ is selected from the group consisting of Group OMC-I or Group OMC-II, and wherein said organoaluminum compound has the following general formula $$Al(X^5)_n(X^6)_{3-n}$$

wherein $(X^5)$ is a hydrocarbyl having from 1–20 carbon atoms, and wherein $(X^6)$ is a halide, hydride, or alkoxide, and wherein "n" is a number from 1 to 3 inclusive, wherein said solid mixed oxide compounds comprise oxygen and at least two elements selected from the group consisting of groups 2, 3, 4, 5, 6, 7, 8, 9, 10, 11, 12, 13, 14, and 15 of the periodic table, including lanthanides and actinides;

wherein said solid mixed oxide compound is calcined at a temperature in a range of about 300° C. to about 900° C. for a time in the range of about 1 minute to about 100 hours to form a calcined solid mixed oxide component; and wherein there is a substantial absence of borate compounds and aluminoxanes in said composition.

2. A process according to claim 1 wherein said activity is greater than 150.

3. A process according to claim 2 wherein said activity is greater than 200.

4. A process according to claim 3 wherein said activity is greater than 250.

5. A process according to claim 4 wherein said activity is greater than 300.

6. A composition produced by the process of claim 1.

7. A composition produced by the process of claim 5.

8. A process to produce a composition of matter, said process comprising contacting at least one organometal compound, at least one solid mixed oxide compound, and at least one organoaluminum compound to produce said composition, wherein said composition can polymerize ethylene into a polymer with an activity greater than 300 (gP/(gS·hr)), and wherein said organometal compound is selected from the group consisting of
bis(cyclopentadienyl)hafnium dichloride;
bis(cyclopentadienyl)zirconium dichloride;
[ethyl(indenyl)₂]hafnium dichloride;
[ethyl(indenyl)₂]zirconium dichloride;
[ethyl(tetrahydroindenyl)₂]hafnium dichloride;
[ethyl(tetrahydroindenyl)₂]zirconium dichloride;
bis(n-butylcyclopentadienyl)hafnium dichloride;
bis(n-butylcyclopentadienyl)zirconium dichloride;
((dimethyl)(diindenyl)silane)zirconium dichloride;
((dimethyl)(diindenyl)silane)hafnium dichloride;
((dimethyl)(ditetrahydroindenyl)silane)zirconium dichloride;
((dimethyl)(di(2-methyl indenyl))silane)zirconium dichloride;
bis(fluorenyl)zirconium dichloride, and wherein said organoaluminum compound is selected from the group consisting of
trimethylaluminum;
triethylaluminum;
tripropylaluminum;
diethylaluminum ethoxide;
tributylalunum;
triisobutylalumininum hydride;
triisobutylaluminum;
diethylaluminum chloride, and wherein said solid mixed oxide compounds are at least two selected from the group consisting of Al₂O₃, B₂O₃, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $Th_{O2}$, $TiO_2$, $V_2O_5$, $WO_3$, $Y_2O_3$, ZnO, and $ZrO_2$;

wherein said solid mixed oxide compound is calcined at a temperature in a range of about 300° C. to about 900° C. for a time in the range of about 1 minute to about 100 hours; and wherein there is a substantial absence of borate compounds and aluminoxanes.

9. A process according to claim 8 wherein said solid mixed oxide compound is calcined at a temperature in a range of about 500° C. to about 700° C. for a time in the range of about 1 hour to about 10 hours.

10. A process according to claim 1 wherein said solid mixed oxide compound comprises oxygen and at least three elements selected from the group consisting of groups 2, 3, 4, 5, 6, 7, 8, 9, 10, 11, 12, 13, 14, and 15 of the periodic table, including lanthanides and actinides.

11. A process according to claim 10 wherein said three elements are zirconium, boron, and aluminum.

12. A process according to claim 1 consisting essentially of contacting said organometal compound, said solid mixed oxide compound, and said organoaluminum compound to produce said composition.

13. A process according to claim 12 wherein said solid mixed oxide compound comprises oxygen and at least three elements selected from the group consisting of groups 2, 3, 4, 5, 6, 7, 8, 9, 10, 11, 12, 13, 14, and 15 of the periodic table, including lanthanides and actinides.

14. A process according to claim 13 wherein said three elements are zirconium, boron, and aluminum.

15. A process according to claim 1 wherein said calcining is conducted for about 1 hour to about 10 hours at a temperature in the range of about 500 to about 700° C.

16. A process according to claim 1 wherein said composition is produced by a process comprising:

1) contacting said organometal compound and said calcined solid mixed oxide component together for about 1 minute to about 1 hour at a temperature of about 25 to about 100° C. to form a first mixture, 2) contacting said first mixture with an organoaluminum compound to form said composition.

17. A process to produce a composition, said process comprising:

1) dissolving aluminum nitrate nonahydrate, boric acid, and zirconyl nitrate dihydrate in deonized water to form a first mixture;

2) contacting said first mixture with ammonium hydroxide to produce a gel;

3) washing and drying said gel at 100° C. to produce a dried gel;

4) grinding said dried gel through a 35 mesh screen;

5) calcining said dried gel at a temperature of 600° C. to produce a solid mixed oxide compound;

6) contacting said solid mixed oxide compound with bis(n-butylcyclopentadienyl)zirconium dichloride and triethylaluminum to produce said composition.

18. A composition produced by the process of claim 8.
19. A composition produced by the process of claim 12.
20. A composition produced by the process of claim 13.
21. A composition produced by the process of claim 16.
22. A composition produced by the process of claim 17.

23. A composition according to claim 6 wherein said composition subsequent to contacting the organometal compound, solid mixed oxide compound, and organoaluminum compound consists essentially of organometal compound and solid mixed oxide compound.

24. A composition according to claim 23 wherein said composition subsequent to contacting the organometal compound, solid mixed oxide compound, and organoaluminum compound consists essentially of organometal compound, solid mixed oxide compound, and organoaluminum compound.

* * * * *